US 6,581,901 B2

(12) United States Patent
Comley

(10) Patent No.: US 6,581,901 B2
(45) Date of Patent: Jun. 24, 2003

(54) AUTOMATIC VACUUM SHUT-OFF/NOISE REDUCTION DEVICE

(75) Inventor: Gord N. Comley, Winnipeg (CA)

(73) Assignee: The Boeing Company, Chicago, IL (US)

(*) Notice: Subject to any disclaimer, the term of this patent is extended or adjusted under 35 U.S.C. 154(b) by 12 days.

(21) Appl. No.: 09/930,516

(22) Filed: Aug. 15, 2001

(65) Prior Publication Data

US 2003/0034467 A1 Feb. 20, 2003

(51) Int. Cl.[7] .............................................. F16K 1/22
(52) U.S. Cl. ...................... 251/58; 251/305; 173/169
(58) Field of Search ................. 251/58, 305; 173/169, 173/168

(56) References Cited

U.S. PATENT DOCUMENTS

| | | | |
|---|---|---|---|
| 1,588,275 A | | 6/1926 | Schutte |
| 3,568,975 A | * | 3/1971 | Obermaier et al. ........... 251/58 |
| 3,785,092 A | | 1/1974 | Hutchins |
| 3,929,314 A | * | 12/1975 | Stratynski ...................... 251/58 |
| 4,073,465 A | * | 2/1978 | Sheppard ...................... 251/58 |
| 4,200,258 A | * | 4/1980 | Gliatas ........................ 251/305 |
| 4,299,373 A | * | 11/1981 | Troyer .......................... 251/58 |
| 5,086,801 A | * | 2/1992 | Peacock et al. ............... 251/58 |
| 5,120,983 A | | 6/1992 | Samann |
| 5,184,382 A | * | 2/1993 | Ward et al. .................. 173/169 |
| 5,445,558 A | | 8/1995 | Hutchins |
| 5,531,639 A | | 7/1996 | Catalfamo |
| 5,606,767 A | | 3/1997 | Crlenjak |
| 5,967,486 A | * | 10/1999 | McCrory et al. ............. 251/58 |
| 6,149,511 A | | 11/2000 | Huber |

* cited by examiner

Primary Examiner—Ehud Gartenberg
Assistant Examiner—John Bastianelli
(74) Attorney, Agent, or Firm—Harness Dickey & Pierce P.L.C.

(57) ABSTRACT

An automatic shut-off of a vacuum line for a tool having a first hose portion and a second hose portion, the portions of hoses being in fluid communication with each other. A first member is disposed in the first hose portion and the first member is moveable between a first position and a second position. A valve is disposed in the second hose portion, wherein the valve is movable between an open position and a closed position. A second member operatively interconnects the first member and the valve. The first member operatively moves said second member to open and close the valve. When the tool is being operated the first member will move, thus opening the valve, to allow a vacuum through the tool. Also, the automatic shut-off significantly reduces noise produced by the tool during operation.

18 Claims, 2 Drawing Sheets

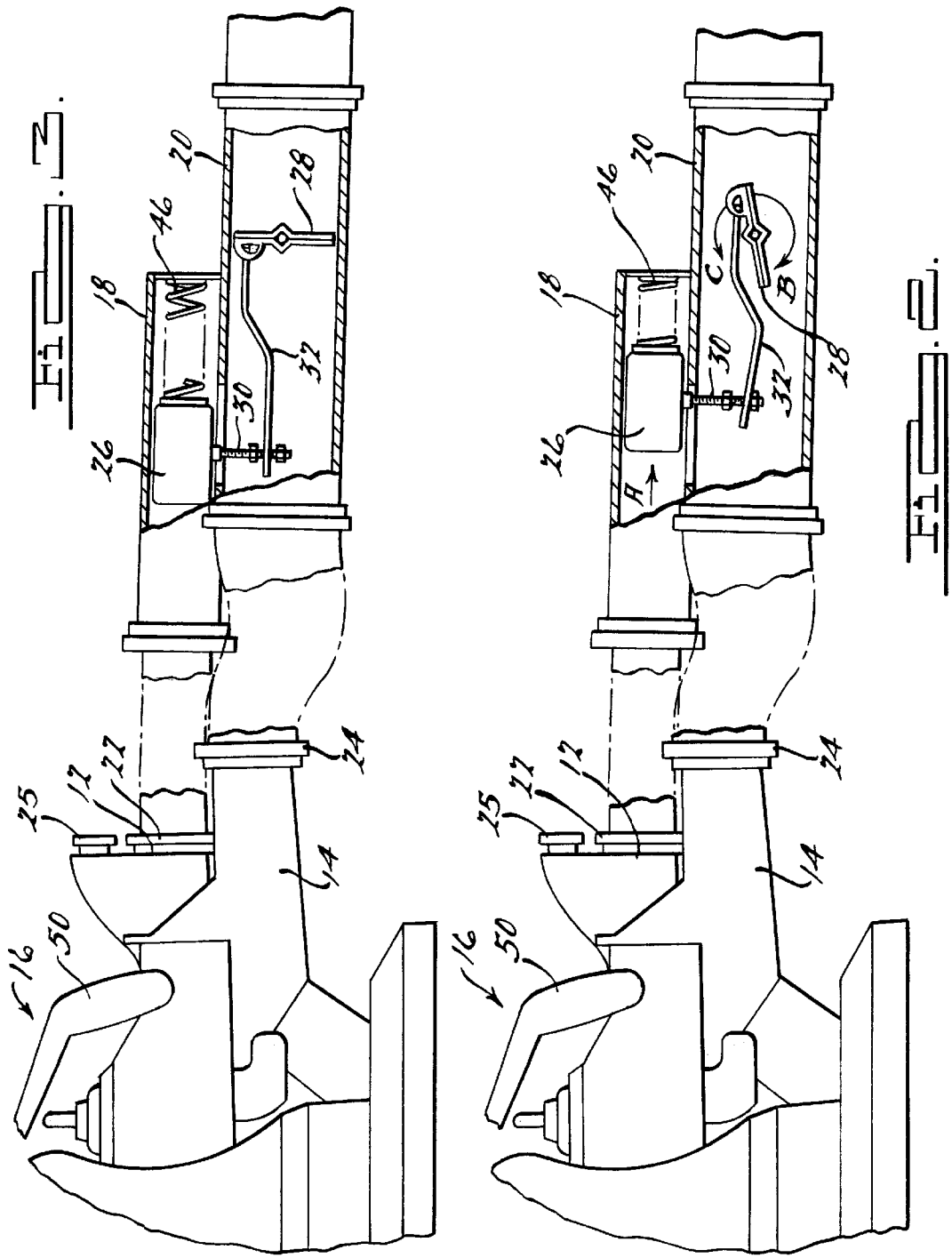

AUTOMATIC VACUUM SHUT-OFF/NOISE REDUCTION DEVICE

FIELD OF THE INVENTION

The present invention relates to a shut-off valve for a vacuum hose connected to a hand tool. More particularly, the present invention relates to an automatic shut-off valve for an air-driven hand tool wherein the exhaust air from the hand tool opens the valve controlling the vacuum airflow applied to the tool.

BACKGROUND OF THE INVENTION

It is known in the art to include a vacuum or other collection device to remove debris and dust produced by a tool. In particular, a vacuum source may be affixed or attached to a tool to draw off the dust from a sanding operation while the tool is in use. Generally, the vacuum being pulled on the hand tool is continuous regardless of whether the tool is in use or not. When the tool is not in use, the air being drawn through the vacuum line is pulled through the tool creating a great deal of noise.

It is also known in the art to have a valve system that may direct the vacuum to a particular tool being used. However, generally this requires a second control unit to ensure that the valve is directing the vacuum airflow to the proper tool. Furthermore, this system does not include an automatic shut-off such that a valve associated with a given tool is only opened when the tool is powered on for use, and is automatically closed when the tool is powered off.

It is also known in the art to have an automatic activation for a vacuum when a particular tool is activated. Generally this is performed with electronic switches that sense when the tool is actuated and then turns on a vacuum system. Therefore, the vacuum is not applied when the tool is not in use. Additional circuitry and switches are also required to operate such a system to ensure that the vacuum airflow is started only when the tool is in use.

It would therefore be desirable to provide a system where a vacuum airflow is pulled through a tool only when the tool is in operation.

It would further be desirable to provide a valve that can be affixed to any air-driven tool, that can also be attached to a vacuum line to thus control the application of a vacuum airflow to the tool.

It would also be desirable to provide a valve that may be placed anywhere in a vacuum line lending to a tool. It would also be desirable to provide such a valve that may be retrofitted to existing tools and vacuum lines.

Finally, it would be desirable to provide a system in which a continuous vacuum airflow may be drawn through a vacuum line coupled to a tool without drawing the vacuum airflow through the tool itself. The vacuum airflow would ideally only be drawn through the tool when the tool is activated, and thus activation of the tool itself would control opening of the vacuum line valve.

SUMMARY OF THE INVENTION

The above mechanism and other features are provided for by a vacuum shut-off valve in accordance with the preferred embodiments of the present invention. The vacuum shut-off valve includes a first section and a second section of hose interconnected in flow communication with one another. Placed in a first section of hose, which is coupled to an exhaust port of an air-driven tool, is a first valve. The first valve preferably comprises a ram valve or a slideable valve. Positioned in the second section of hose which is coupled between a vacuum port of an air-driven tool and a vacuum source is a second valve. The second valve preferably comprises a butterfly valve.

When the air-driven tool is activated, air travels through the tool and is exhausted out of the exhaust port. When the air is exhausted from the exhaust port, the first valve is moved from a first position to a second position. The first valve is interconnected to the second valve thereby operating the second valve when the first valve is moved. The second valve is in a closed position until the first valve is moved to the second position, where upon the second valve is opened. When the second valve is opened, the vacuum airflow from the vacuum source is pulled through the tool through the vacuum port, thus removing dust and debris created by the tool through the second section of hose.

The first valve is only moved to the second position when air is exhausted from the air-driven tool; therefore the first valve is only moved when the air tool is being operated. Due to this arrangement, the second valve is also only moved to the open position when the air tool is being operated, therefore selectively allowing a vacuum airflow to be applied to the tool only when the tool is being operated. The vacuum airflow is not allowed to be pulled through the tool when the second valve is in the closed position. Thus, an automatic vacuum airflow shut-off system is created such that the vacuum airflow is only pulled through the tool when the tool is being operated.

BRIEF DESCRIPTION OF THE DRAWINGS

The present invention will become more fully understood from the detailed description and the accompanying drawings, wherein:

FIG. 2 is an automatic shut-off assembly in an open position according to the present invention installed in air lines; and FIG. 3 is an automatic shut-off assembly in a closed position according to the present invention installed in air lines.

DETAILED DESCRIPTION OF THE PREFERRED EMBODIMENTS

Figure 1:
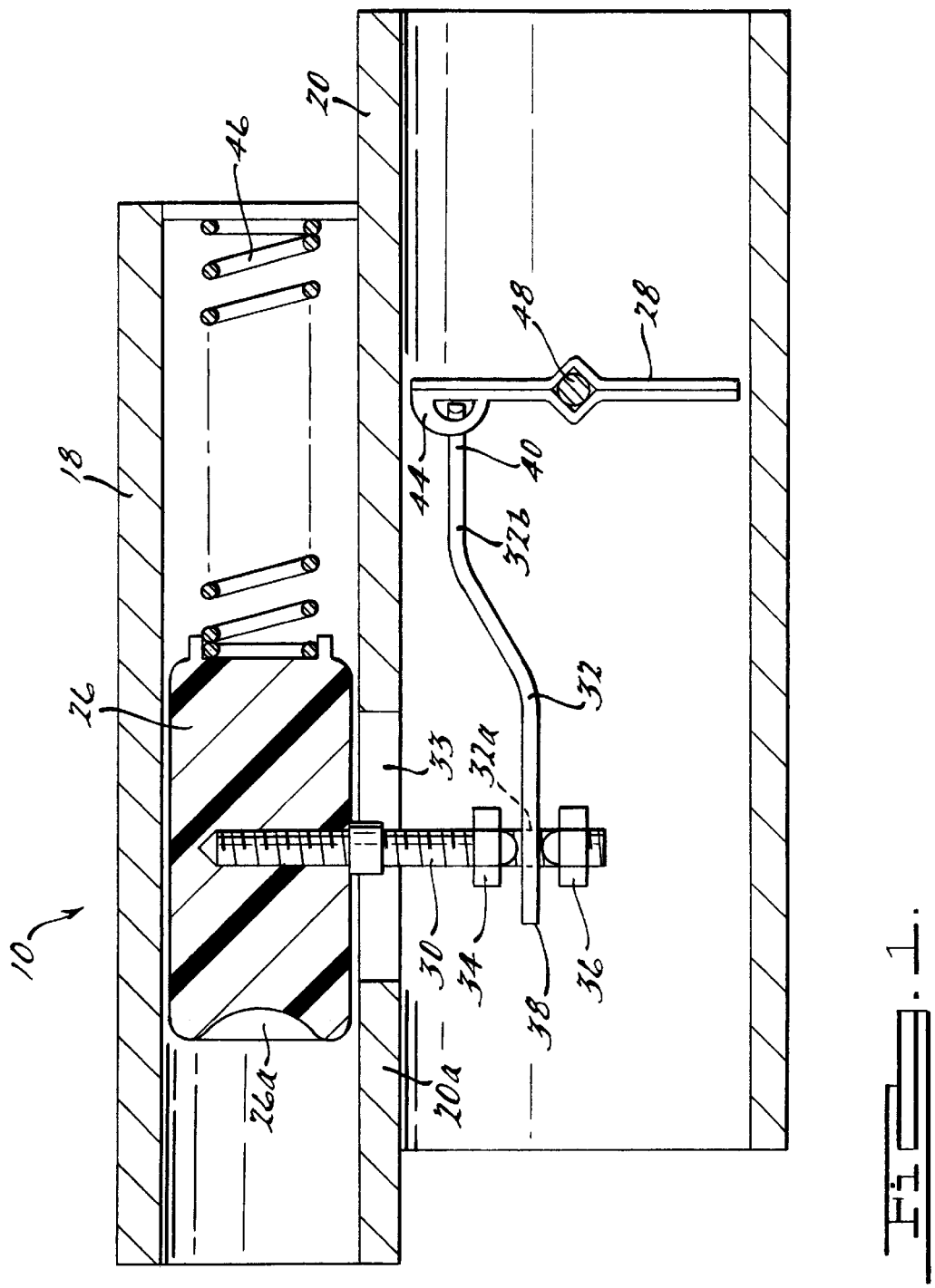
FIG. 1 is a cross-sectional view of a preferred embodiment of an automatic vacuum airflow shut-off system according to the present invention installed in communication with an exhaust port of an air-driven tool.

The following description of the preferred embodiment(s) is merely exemplary in nature and is in no way intended to limit the invention, its application, or uses.

With reference to FIGS. 1, 2 and 3, an automatic shut-off system 10 in accordance with a preferred embodiment of the present invention is shown coupled to an exhaust port 12 and a vacuum coupler 14 of an air-driven tool 16. The automatic shut-off system 10 includes a first hose section 18 and a second hose section 20. The first hose section 18 is secured to the exhaust port 12 of the tool 16 via a coupling device 22. The second hose section 20 is coupled to the vacuum coupler 14 via a coupling device 24. An inlet coupler 25 is to couple a pressurized fluid source to supply compressed air to the tool 16.

With further reference to FIGS. 1 and 3, the first hose section 18 includes a ram 26 and a butterfly valve 28. The ram 26 is preferably affixed to the butterfly valve 28 through a first member 30 and a second member 32. Preferably the first member 30 is affixed to the ram 26 through interior threads included in the ram 26. In particular, the first member 30 is a threaded bolt that is threaded into the ram 26 to secure the first member 30 thereto. The first member 30 extends through an elongated slot 33 in a wall 20a of the first hose section 18 and is also operatively interconnected to the second member 32. The second member 32 includes an aperture 32a to receive the first member 30. Threads extend to the end of the first member 30 to receive holding nuts 34 and 36. The first holding nut 34 is positioned above a terminal end 38 of the second member 32, while the second holding nut 36 is positioned below the terminal end of the second member 32. The holding nuts 34, 36 are tightened around the second member 32 to affix the first member 30 to the second member 32. An opposite end 40 of the second member 32 is pivotally affixed to the butterfly valve 28 by bending the opposite end 40 substantially 90 degrees to a main portion 32b of the second member 32, and extending within a loop 44 formed at one end of the butterfly valve 28. It will be understood that a pin may alternatively be used at the opposite end 40 of the second member 32 to be received in the loop 44.

The ram 26 rides, and is able to slide, in the first hose section 18 and is biased in a first position by a compression spring 46. The butterfly valve 28 is pivotally affixed via a mounting pin 48 in the second hose section 20. As will be discussed below the movement of the ram 26 pivots the butterfly valve 28.

Air is supplied to the air-driven tool 16 via its inlet coupler 25, but is not allowed to activate and flow through the air-driven tool 16 until a trigger 50 of the tool 16 is depressed to turn on the tool 16. When the trigger 50 is depressed, air travels through the air-driven tool 16, driving the tool 16, and then leaving the tool 16 through the exhaust port 12. When the first hose section 18 is coupled to the exhaust port 12, air travels through the first hose section 18 as well. As the air flows through the first of hose section 18, the air forces the ram 26 towards the rear of the first hose section 18 to a second position in the direction of arrow A, as shown in FIG. 3. The ram 26 may include a concave face 26a to better receive the airflow. The ram 26 is pushed with enough force to compress the compression spring 46, thereby moving the second member 32 laterally within the second hose section 20. Since the ram 26 and first member 30 are interconnected to the second member 32, the butterfly valve 28 is also rotated in the direction of Arrow B, as indicated in FIG. 3.

A vacuum airflow is constantly drawn through the second hose section 20 of the system 10. However, when the butterfly valve 28 is in the closed position (shown particularly in FIGS. 1 and 3), the vacuum does not reach the air-driven tool 16. When the butterfly valve 28 is in the closed position, the vacuum is also not being substantially pulled through the second hose section 20 proximal to the vacuum coupler 14.

During operation, air from the exhaust port 12 drives the ram 26 back, thereby opening the butterfly valve 28 by turning it in the direction of arrow B in FIG. 3. When the butterfly valve 28 is opened, the vacuum is pulled throughout the entire length of the second hose section 20, and furthermore through the air-driven tool 16. As an additional benefit, the vacuum helps to pull air through the first hose section 18, which is coupled to the exhaust port 12 of the air-driven tool 16. In this way, the vacuum airflow being pulled through the second hose section 20 will also assist in the driving of the air-driven tool 16 by decreasing the pressure on the exhaust port 12. Furthermore, as the compressed air travels through elongated slot 33, the noise generally associated with air driven tools is greatly reduced. Due to the addition of the shut-off valve 10, noise from the tool 16 is reduced. In particular, a reduction in noise during operation is generally between five and 25 decibels. Therefore, the automatic shut-off valve 10 also acts as a muffler to help significantly reduce ambient noise produced by the tool 16 during operation.

When the air-driven tool 16 is no longer activated, the absence of an exhaust flow will allow the compression spring 46 to decompress and drive the ram 26 towards the tool 16. In this way the ram 26 will move the first member 30 laterally to the left, thereby moving the butterfly valve 28 to the closed position by rotating the butterfly valve 28 in the direction of arrow C in FIG. 3. When the butterfly valve 28 has returned to its closed position (as illustrated in FIGS. 1 and 3), the vacuum airflow is no longer being drawn through the air-driven tool 16.

It will be understood that the automatic shut-off system 10 of the present invention may be positioned at any distance proximal or distal to the air-driven tool 16 so long as the first hose section 18 is in fluid connection with the exhaust port 12 of the tool 16 and the second hose section 20 is in fluid connection with the vacuum port 14 of the tool 16. It will also be understood that the first hose section 18 and the second hose section 20 need not be in fluid connection to gain the advantage of the automatic shut-off valve 10 as long as the ram 26 is otherwise operatively coupled to the valve 28 in the second hose section 20. As long as the ram 26 is driven by the air from the exhaust to the tool it will then operate the valve 28. Furthermore, the addition or subtraction of a tool from a vacuum system would not affect the vacuum system since a vacuum is not drawn through tools not in operation therefore increasing the efficiency of the vacuum system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automatic vacuum airflow shut-off system for use with an air powered tool, such system comprising:

a first hose portion in communication with a vacuum coupler portion of said tool;

a second hose portion in fluid communication with the first hose portion and in fluid communication with an exhaust port of said tool;

a ram disposed in said first hose portion, wherein said ram is moveable between a first position and second position;

a biasing member for maintaining said ram in said first position;

a valve disposed in said second hose portion, wherein said valve is positionable between an open position and a closed position in response to movement of said ram between said second position and said first position, respectively; and a member operatively coupling said ram and said valve, wherein said ram operatively moves said member to position said valve in said open position in response to an exhaust airflow from said exhaust port, thereby permitting a vacuum airflow to be applied to said vacuum coupler of said tool, and wherein an interruption of said exhaust airflow enables said biasing member to urge said ram into said first position, thereby moving said valve into said closed position and interrupting said vacuum airflow drawn through said vacuum coupler of said tool.

2. The automatic shut-off of claim 1, wherein said exhaust airflow occurs when said tool is activated.

3. The automatic shut-off of claim 1, wherein said vacuum airflow increases the efficiency of said tool.

4. The automatic shut-off of claim 3, wherein said vacuum air flow decreases noise from said air driven tool.

5. The automatic shut-off of claim 1, wherein the block is biased in said first position by a coil spring, wherein the tightness of the spring may be adjusted to determine the ease of moving said block from said first position to said second position.

6. The automatic shut-off of claim 1, wherein the valve is a butterfly valve which rotates about a pivot point at a first point and pivotally affixed to said member at a second point.

7. A vacuum shut-off mechanism comprising:

a tool, selectively driven by pressurizing a portion of said tool with a fluid, having an exhaust port and a vacuum port;

a first hose portion coupled to said exhaust port;

a ram disposed within said first hose portion and wherein said ram is movable between a first position and a second position by the pressure of air coming from said exhaust port;

a biasing member to urge said ram to said first position;

a second hose portion coupled to said vacuum port;

a valve pivotally affixed within said second hose portion wherein said valve is positionable between an open position and a closed position in response to said movement of said ram; and a member operatively communicating said ram with said valve so that when said tool is selectively pressurized said ram moves from said first position to said second position and said valve moves from said closed to said open position.

8. The vacuum shut-off of claim 7, wherein said first portion of hose and said second portion of hose are in fluid communication through an aperture in each of said portions.

9. The vacuum shut-off of claim 8, wherein said member extends through said apertures.

10. The vacuum shut-off of claim 7, wherein said biasing member is a spring.

11. The vacuum shut-off of claim 7, wherein the valve is a butterfly valve pivotally affixed to said second portion of hose at a first pivot point and pivotally affixed to said member at a second pivot point.

12. The vacuum shut-off of claim 7, wherein when said tool is selectively pressurized with said fluid said fluid flows through said first hose portion and said second hose portion to reduce noise created by selectively pressurizing said tool.

13. A vacuum shut-off mechanism comprising:

a pressurized fluid source;

a constant vacuum source;

a tool selectively driven by said pressurized fluid source, having an exhaust port to exhaust fluid from said pressurized fluid source and a vacuum port in communication with said vacuum source;

a first hose coupled to said exhaust port having a first member slidable from a first position to a second position within said first hose when said tool is driven;

a second hose, coupled to said vacuum port between said tool and said vacuum source having a second member pivotally affixed within said second hose wherein said second member is pivotable between a closed position and an open position; and a third member operatively coupling said first member and said second member such that said first member rotates said second member when said first member slides.

14. The vacuum shut-off mechanism of claim 13, wherein said second member is a valve which substantially stops the flow of air through the second hose when said valve is in said closed position.

15. The vacuum shut-off mechanism of claim 14, wherein said constant vacuum is not drawn through said air-driven tool when said valve is in said closed position.

16. The vacuum shut-off mechanism of claim 13, wherein said first member substantially blocks said first hose.

17. The vacuum shut-off mechanism of claim 13, wherein said tool is selectively driven by an operator.

18. The vacuum shut-off mechanism of claim 17, wherein said fluid flows through said first hose portion and said second hose portion to reduce noise produced by said tool when said tool is selectively driven by said operator.

* * * * *